(12) United States Patent
Riche et al.

(10) Patent No.: US 6,770,366 B2
(45) Date of Patent: Aug. 3, 2004

(54) CORED WIRE FOR INTRODUCING ADDITIVES INTO A MOLTEN METAL BATH

(75) Inventors: Dominique Bernard Riche, Tilloy Lez Cambrai (FR); Jean-Claude Becart, Curgies (FR)

(73) Assignee: Affival S.A., Solesmes (FR)

( * ) Notice: Subject to any disclaimer, the term of this patent is extended or adjusted under 35 U.S.C. 154(b) by 33 days.

(21) Appl. No.: 09/809,050

(22) Filed: Mar. 16, 2001

(65) Prior Publication Data

US 2002/0025434 A1 Feb. 28, 2002

(30) Foreign Application Priority Data

Jun. 28, 2000 (FR) .............................................. 00 08284

(51) Int. Cl.⁷ .............................. D02G 3/00; C21B 3/02
(52) U.S. Cl. ....................... 428/379; 428/375; 428/377; 428/383; 428/389; 428/381; 75/303; 75/304; 75/314; 75/331
(58) Field of Search ................................ 428/375, 379, 428/377, 383, 389, 381; 75/303, 304, 314, 331

(56) References Cited

U.S. PATENT DOCUMENTS

| | | | | |
|---|---|---|---|---|
| 3,921,700 A | * | 11/1975 | Frantzreb, Sr. et al. ....... | 164/55 |
| 3,991,808 A | * | 11/1976 | Nieman et al. ................ | 164/55 |
| 3,991,810 A | * | 11/1976 | Nieman ........................ | 164/55 |
| 4,040,468 A | * | 8/1977 | Nieman ........................ | 164/55 |
| 4,163,827 A | | 8/1979 | Nieman et al. | |
| 4,199,351 A | * | 4/1980 | El Gammal ................... | 75/53 |
| 4,200,456 A | * | 4/1980 | Fujii ............................. | 75/93 |
| 4,277,282 A | * | 7/1981 | Guthrie et al. ................. | 75/53 |
| 4,297,133 A | * | 10/1981 | Fujii ............................. | 75/53 |
| 4,652,299 A | * | 3/1987 | Bienvenu et al. .............. | 75/53 |
| 4,832,742 A | * | 5/1989 | Ototani ........................ | 75/256 |
| 5,352,271 A | * | 10/1994 | Margaria et al. .............. | 75/526 |
| 5,376,160 A | * | 12/1994 | Neuer et al. .................. | 75/304 |
| 6,280,497 B1 | * | 8/2001 | King et al. .................... | 75/304 |
| 6,346,135 B1 | * | 2/2002 | King et al. .................... | 75/304 |
| 2002/0025434 A1 | * | 2/2002 | Riche et al. ................... | 428/375 |

FOREIGN PATENT DOCUMENTS

DE 29 23 236 A 12/1980
EP 0 032 874 A 7/1981

OTHER PUBLICATIONS

Patent Abstracts of Japan, vol. 014, No. 236 (C–0720) May 18, 1990 & JP 02 061006A (Hitachi Cable LTD), Mar. 1, 1990, Abstract.

* cited by examiner

*Primary Examiner*—Marie R. Yamnitzky
*Assistant Examiner*—Jill M Gray
(74) *Attorney, Agent, or Firm*—Miles & Stockbridge P.C.; Edward J. Kondracki; John C. Kerins

(57) ABSTRACT

The invention relates to a cored wire for introducing additives into a molten metal bath comprising a metallic sheath (5) containing an additive (6), which metallic sheath is covered by a wrapping (7) which, being combustible without leaving harmful residues, momentarily retards the propagation of heat to the core of the cored wire, this cored wire being characterized in that on top of this combustible wrapping, a protective metallic casing encloses the assembly thus constituted by the additive, the metallic sheath and the combustible wrapping.

15 Claims, 1 Drawing Sheet

CORED WIRE FOR INTRODUCING ADDITIVES INTO A MOLTEN METAL BATH

The invention relates to a cored wire for introducing additives into a molten metal bath.

Steels, irons, etc., are materials whose mechanical or other properties particularly depend on the complex composition of the material.

In order to obtain a material having certain properties from a basic composition, the content of certain elements is adjusted to obtain the desired composition.

It has been known for about twenty years to adjust the composition of molten material by introducing a cored wire of predetermined length into it.

This cored wire is constituted by a metallic casing containing the additive that one wishes to introduce into the molten bath.

The quantity of additive per meter being known, it is relatively simple to adjust the composition of the bath.

In the first cored wires produced, the metallic casing was simply folded so as to place the two edges of the formed strip side by side.

An inner sheet was first put in place in order to close the gap that remained between the edges of said strip, but this was not very effective given that this cored wire was subjected to a winding operation on a reel, then an unwinding operation during its utilization.

This solution was quickly replaced by a different closure for the strip.

This method consists of mechanically crimping the two edges of the strip.

More precisely, it consists of rolling the two edges together so that the edges are fastened to one another. This prevents losses of the additive contained in said strip.

This solution, which makes it possible to adjust a composition by introducing a cored wire into the molten material, works very well with most additives.

However, problems arise with certain additives such as calcium, magnesium, selenium, sulfur and others.

In essence, for some of these additives, the heat of the molten metal bath causes the cored wire to explode in an area very close to the surface of the bath.

Other additives vaporize very quickly and close to the surface. This produces a strong surface reactivity, which results in an oxidation and/or renitriding of the bath, splashes of the liquid metal that damage the material, and heavy smoke emanation. Therefore, this introduction operation is much less efficient in the presence of these additives, and the resulting safety conditions are not adapted for industrial utilization.

In an attempt to eliminate this problem, it is known to introduce the cored wire through a tube made of refractory material immersed in the bath. The use of this tube is very difficult and very costly.

It is known to cover this metallic sheath with a wrapping which, being combustible without leaving any harmful residues, momentarily retards the propagation of heat to the core of the cored wire. This combustible wrapping is wound in a helix around the metallic sheath. Unfortunately, the paper wrapping is sometimes observed to deteriorate during handling, i.e., when the wire is wound around the reel or when the wire placed on the reel is unwound in order to be introduced into the bath.

SUMMARY OF THE INVENTION

The subject of the invention is a cored wire comprising a metallic sheath containing an additive and covered by a wrapping 7 which, being combustible without leaving any harmful residues, momentarily retards the propagation of heat to the core of the cored wire.

BRIEF DESCRIPTION OF THE DRAWINGS

The invention will be better understood with the help of the following description given as a non-limiting example, in reference to the attached drawing, which schematically represents.

Figure 1:
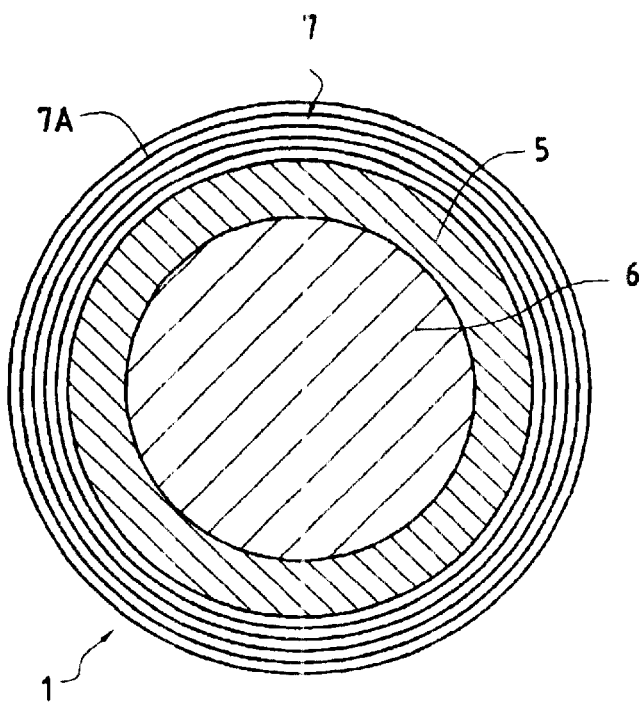
FIG. 1: a cross-section of a cored wire according to the invention.
Figure 2:
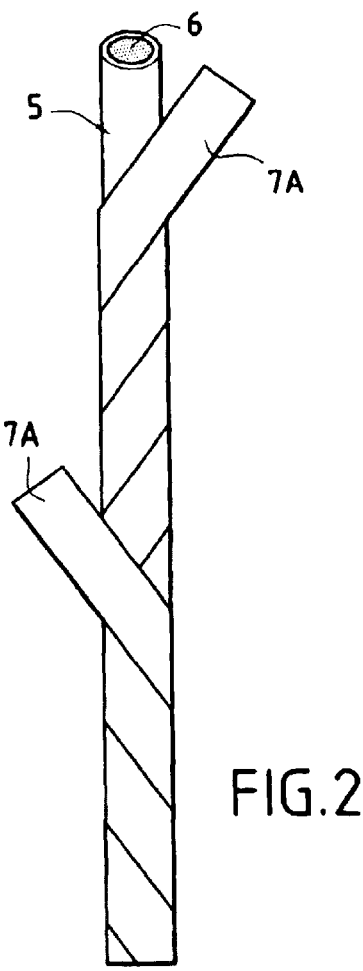
FIG. 2: a step in the preparation of the cored wire.
Figure 3:
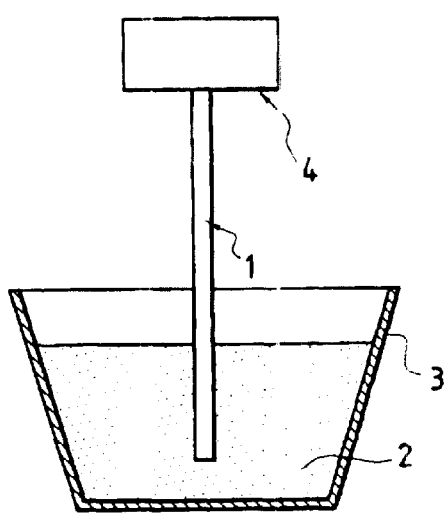
FIG. 3: an installation using a cored wire.

Referring to the drawing, we see a cored wire 1 designed for the introduction of an additive into a bath 2 of molten material, such as a steel, an iron, or another material.

This molten bath is at a relatively high temperature, and is contained in a ladle 3.

In order to adjust the composition of the bath of molten material, this cored wire 1 is introduced into the bath at a predetermined speed.

The means of introduction 4 are conventional and will not be described in detail.

Conventionally, this cored wire comprises a metallic sheath 5 containing an additive 6.

This metallic sheath 5 is closed mechanically, which means that the edges of the strip are attached to one another, for example by rolling.

Advantageously, this metallic sheath is covered by a wrapping 7 which, being combustible without leaving any harmful residues, momentarily retards the propagation of heat to the core of the cored wire.

Harmful residues would include residues that affect the composition of the bath or produce inclusions that modify the behavior of the bath during casting.

Advantageously, the protective wrapping 7 is constituted by at least one layer 7A of paper rolled around the metallic sheath.

The paper 7A is a paper for so-called pyrotechnic applications.

This means that it is flame-resistant and has a thermal resistance coefficient higher than that of a sheet of ordinary paper.

This thermal protection is obtained:
either by integrating the flame-retardant constituents into the composition of the paper,
or by combining the paper layer and the adhesive used to attach the superposed strips to one another.

For example, there are known uncoated, wood-free, guaranteed flame-retardant M1 papers. This requires a material whose the flame propagation is nil, with no falling of burning drops and no flame persistence.

This wrapping has thermal insulation properties while being combustible.

Tests performed with one type of paper showed that:
without a paper layer, the cored wire explodes after one second,
with two layers, the cored wire explodes after one-and-a-half seconds, and
with ten layers, the cored wire explodes after two-and-two-tenths seconds.

Thus, by adjusting the thickness of the wrapping and the speed at which the cored wire is introduced, it is possible to sufficiently retard either the explosion or the vaporization, and it is then easy to introduce the cored wire to a sufficient depth.

The layer or layers of the wrapping are advantageously constituted by one or more helical windings of a strip of paper.

These windings are for example crossed.

In a variant of embodiment, an external fixation of these layers is achieved by applying a layer of varnish, which must clearly be free from water or any substances that react violently with the material constituting the bath.

Therefore, a fixative layer is provided for the wrapping, especially when the latter is formed by several strips.

The width of the strip is preferably adapted to the diameter of the wire and to the conditions for utilization, and is for example between five and forty centimeters.

The thickness of the protective wrapping is therefore adapted to the user's needs (temperature of the bath and material to be injected).

Figure 4:
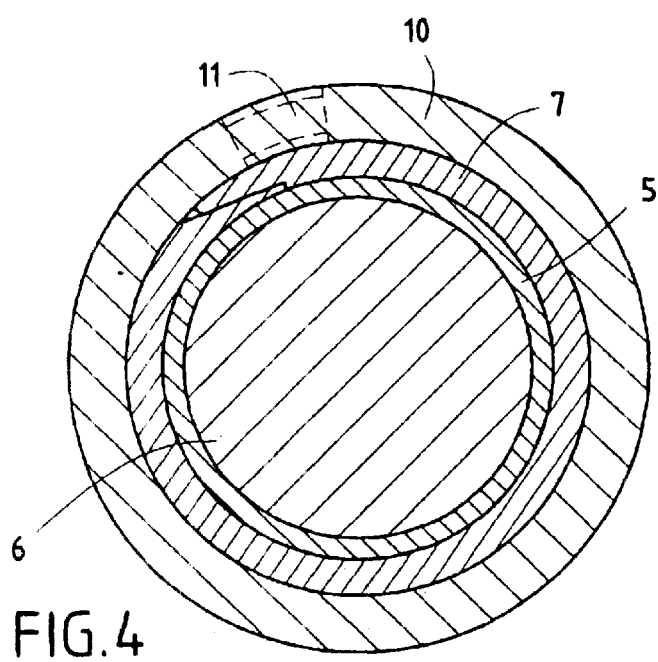
FIG. 4: a cross-section of a variant of a cored wire.

Advantageously (FIG. 4), particularly in certain cases where the injection machine could damage the combustible wrapping, on top of this combustible wrapping 7, a protective metallic casing 10 encloses the assembly constituted by the additive, the metallic sheath and the combustible wrapping.

Said assembly is therefore covered by a protective metallic casing.

This protective metallic casing 10 prevents the combustible wrapping from being altered during the handling of the cored wire and forms, with the metallic sheath housing the additive and the combustible wrapping, a complex material that retards the melting of the assembly.

Advantageously, this protective metallic casing is constituted by a strip whose edges are crimped to form a tubular element.

This is the method normally used to form the metallic sheath housing the additives.

The shape of the crimp 11 is not illustrated.

This is the method that seems to be simplest to implement and that does not damage the combustible wrapping.

Advantageously, instead of applying the paper sheet in wound form, the paper sheet can be much thicker and can be applied at the same time as the protective metallic casing.

The edges of the thick sheet overlap.

What is claimed is:

1. A cored wire for introducing additives into a molten metal bath comprising a wire core (6) having a metallic sheath (5) thereon containing an additive, and a wrapping (7) around said sheath, said wrapping (6) being combustible without leaving harmful residues, said wrapping being made of a material that will momentarily retard propagation of heat to the wire core (6) when introduced into the molten metal bath.

2. The cored wire according to claim 1, wherein wrapping (7) comprises at least one layer (7A) of paper wound around the metallic sheath (5).

3. The cored wire according to claim 2, wherein paper (7A) is a pyrotechnic paper.

4. The cored wire according to claim 3, wherein a protective metallic casing (10) disposed on top of the combustible wrapping encloses the assembly formed by the wire core (6), the metallic sheath (5), containing the additive, and the combustible wrapping (7).

5. The cored wire according to claim 2, wherein the at least one layer comprises at least one helical winding of a strip of paper.

6. The cored wire according to claim 5, wherein the at least one helical winding is arranged in more than one layer.

7. The cored wire according to claim 6, wherein a protective metallic casing (10) disposed on top of the combustible wrapping encloses the assembly formed by the wire core (6), the metallic sheath (5), containing the additive, and the combustible wrapping (7).

8. The cored wire according to claim 5, wherein the at least one layer has a coating of varnish to provide fixation of the layers.

9. The cored wire according to claim 8, wherein a protective metallic casing (10) disposed on top of the combustible wrapping encloses the assembly formed by the wire core (6), the metallic sheath (5), containing the additive, and the combustible wrapping (7).

10. The cored wire according to claim 5, wherein the width of the strip is between five and forty centimeters.

11. The cored wire according to claim 10, wherein a protective metallic casing (10) disposed on top of the combustible wrapping encloses the assembly formed by the wire core (6), the metallic sheath (5), containing the additive, and the combustible wrapping (7).

12. The cored wire according to claim 5, wherein a protective metallic casing (10) disposed on top of the combustible wrapping encloses the assembly formed by the wire core (6), the metallic sheath (5), containing the additive, and the combustible wrapping (7).

13. The cored wire according to claim 2, wherein a protective metallic casing (10) disposed on top of the combustible wrapping encloses the assembly formed by the wire core (6), the metallic sheath (5), containing the additive, and the combustible wrapping (7).

14. The cored wire according to claim 13, wherein the protective metallic casing (10) comprises a sheet whose edges are crimped to form a tubular element.

15. The cored wire according to claim 13, wherein the combustible wrapping (17) is formed by a thick sheet applied at the same time as the protective metallic casing (10).

* * * * *

UNITED STATES PATENT AND TRADEMARK OFFICE
CERTIFICATE OF CORRECTION

| | | |
|---|---|---|
| PATENT NO. | : 6,770,366 B2 | Page 1 of 1 |
| APPLICATION NO. | : 09/809050 | |
| DATED | : August 3, 2004 | |
| INVENTOR(S) | : Dominique Bernard Riche et al. | |

It is certified that error appears in the above-identified patent and that said Letters Patent is hereby corrected as shown below:

Title Page, Item (30) Foreign Application Priority Data, the following should be added:

--March 05, 2001, (FR) 01 02948--.

Signed and Sealed this

First Day of September, 2009

David J. Kappos
*Director of the United States Patent and Trademark Office*